United States Patent
Davids et al.

(10) Patent No.: US 9,104,086 B1
(45) Date of Patent: Aug. 11, 2015

(54) METHOD AND APPARATUS OF WIDE-ANGLE OPTICAL BEAMSTEERING FROM A NANOANTENNA PHASED ARRAY

(71) Applicant: Sandia Corporation, Albuquerque, NM (US)

(72) Inventors: Paul Davids, Albuquerque, NM (US); Christopher DeRose, Albuquerque, NM (US); Peter Thomas Rakich, New Haven, CT (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 14/188,269

(22) Filed: Feb. 24, 2014

(51) Int. Cl.
| | | |
|---|---|---|
| *G02F 1/295* | (2006.01) | |
| *G02F 1/01* | (2006.01) | |
| *G02B 5/18* | (2006.01) | |
| *B82Y 20/00* | (2011.01) | |
| *G02F 1/29* | (2006.01) | |
| *G02B 6/122* | (2006.01) | |

(52) U.S. Cl.
CPC ............ *G02F 1/2955* (2013.01); *G02B 5/1809* (2013.01); *G02F 1/0147* (2013.01); *B82Y 20/00* (2013.01); *G02B 6/1226* (2013.01); *G02F 2001/291* (2013.01); *Y10S 977/932* (2013.01)

(58) Field of Classification Search
CPC ...... B82Y 20/00; G02B 6/1226; G02B 5/008; G02F 1/0417
USPC .............................................................. 385/4
See application file for complete search history.

(56) References Cited

U.S. PATENT DOCUMENTS

2014/0192394 A1* 7/2014 Sun et al. ...................... 359/289

OTHER PUBLICATIONS

"Fully integrated hybrid silicon free-space beam steering source with 32 channel phased array," by Hulme et al, Proceedings SPIE, v. 8989, pp. 898907-1 through 898907-15, Feb. 1, 2014.*
DeROSE, C.T. et al., "Electronically controlled optical beam-steering by an active phased array of metallic nanoantennas", Opt. Express 1, pp. 5198-5208, Published Feb. 22, 2013.
Doylend, et al., "Two-dimensional free space beam steering with an optical phased array on silicon-on-insulator", Opt. Express 19(22), pp. 21595-21604, 2011.
Van Acoleyen et al., "Two-dimensional optical phased array antenna on silicon-on-insulator", Opt. Express 18(13) pp. 13655-13660, 2010.
Sun, J. et al., "Large-scale nanophotonic phased array", Nature (London), 493, 195-199, 2013.

* cited by examiner

*Primary Examiner* — Robert Tavlykaev
(74) *Attorney, Agent, or Firm* — Martin I. Finston (57) ABSTRACT

An optical beam-steering apparatus is provided. The apparatus includes one or more optical waveguides and at least one row of metallic nanoantenna elements overlying and electromagnetically coupled to a respective waveguide. In each such row, individual nanoantenna elements are spaced apart along an optical propagation axis of the waveguide so that there is an optical propagation phase delay between successive pairs of nanoantenna elements along the row. The apparatus also includes a respective single electric heating element in thermal contact with each of the waveguides. Each heating element is arranged to heat, substantially uniformly, at least that portion of its waveguide that directly underlies the corresponding row of nanoantenna elements.

20 Claims, 10 Drawing Sheets

METHOD AND APPARATUS OF WIDE-ANGLE OPTICAL BEAMSTEERING FROM A NANOANTENNA PHASED ARRAY

STATEMENT REGARDING FEDERALLY SPONSORED RESEARCH OR DEVELOPMENT

This invention was developed under Contract DE-AC04-94AL85000 between Sandia Corporation and the U.S. Department of Energy. The U.S. Government has certain rights in this invention

FIELD OF THE INVENTION

The invention relates to steerable phased arrays for optical transmission and reception.

ART BACKGROUND

Phased arrays are well known in the fields of microwave and radio frequency detection and communication. In those fields, the typical phased array is a phase-coherent arrangement of antenna elements with electronic phase and amplitude control for each element, which is used to shape and direct the beam.

More recently, it has been recognized that phased arrays can also be used to steer optical, e.g. infrared, beams. In an approach based on diffraction of the beam by gratings, for example, wavelength tuning is used to steer the beam along one axis, and phase control is used to steer the beam along the orthogonal axis. Such an approach is described, for example, in the following publications: K. Van Acoleyen, H. Rogier, and R. Baets, "Two-dimensional optical phased array antenna on silicon-on-insulator," *Opt. Express* 18(13), 13655-13660 (2010); and J. K. Doylend, M. J. R. Heck, J. T. Bovington, J. D. Peters, L. A. Coldren, and J. E. Bowers, "Two-dimensional free-space beam steering with an optical phased array on silicon-on-insulator," *Opt. Express* 19(22), 21595-21604 (2011). Further, the use of thermo-optical tuning in a phased array of dielectric grating elements is described, e.g., in J. Sun, E. Timurdogan, A. Yaacobi, E. Shah Hosseini, D. Coolbaugh, and M. R. Watts, "Large-scale nanophotonic phased array," *Nature* (London), 493, 195-199 (2013).

Although such approaches are useful, there remains a need for additional approaches to optical beam steering, particularly if such approaches can provide both a wide frequency-tuning range and a wide two-dimensional scan range in a chip-scale device.

SUMMARY OF THE INVENTION

A more recent approach to optical phased-array beam steering relies on chip-scale silicon photonics technology integrated with a metallic nanoantenna array. An array of nanoantennas scaled for near-infrared emission are fed by silicon waveguides and subjected to individual thermo-optical phase control for steering a surface-normal beam. Such an approach is described, for example, in C. T. DeRose, R. D. Kekatpure, D. C., Trotter, A. Starbuck, J. R. Wendt, A. Yaacobi, M. R. Watts, U. Chettiar, N. Engheta, and P. S. Davids, "Electronically controlled optical beam-steering by an active phased array of metallic nanoantennas," *Opt. Express* 21, 5198-5208 (2013), http://www.opticsinfobase.org/oe/abstract.cfm?URI=oe-21-4-5198, the entirety of which is hereby incorporated herein by reference.

The nanoantenna array can potentially be steered over an extremely wide angle using waveguide thermo-optic heaters to control the individual phases of the respective antenna elements. However, to make the steering range very wide, e.g. approaching 180° along at least one axis, it is necessary to space the antenna elements very closely together. Because of spatial constraints, the spacing that is desirable is difficult to achieve while still providing an individual phase shifter for each antenna element. Stated another way, the pitch of the antenna elements is limited by the presence of the individual phase-shift elements.

We discovered, however, that contrary to what had been previously believed, it is not necessary to provide an individual phase control to each emitter of the array. Instead, the thermo-optical phase elements along, e.g., a one-dimensional array can be treated in aggregate by heating them uniformly with a single controllable heating current. For example, each phase element may simply be a portion of a silicon waveguide that underlies a particular one of the nanoantennas. If, e.g., the nanoantennas are equally spaced relative to propagation length along the waveguide, then at any given uniform temperature there will be an equal phase shift between successive nanoantennas of the linear array.

Such a uniform phase shift, if controllable, will be effective for steering the emissive plane of the one-dimensional array. A plurality of parallel one-dimensional arrays can be arrayed to provide steering in two dimensions. By eliminating the individual phase-shift elements, the pitch limit can be overcome, and nanoantenna spacings can therefore be achieved that make beam steering possible over a range that, in two-dimensional arrays, is potentially as great as $2\pi$ steradians.

Additionally, the resulting beam may have the further advantage of freedom from the random noise, sometimes referred to as "speckle noise" that is typically seen when the emitters are individually phase-biased.

The exemplary embodiment to be described below is for operation as an array of emitter elements. However, the principles to be described below are readily adapted and applied to provide alternate embodiments that operate as steerable arrays of receptive, rather than emissive, elements. Accordingly, both arrays for transmission and arrays for reception should be understood to lie within the scope of the present invention. Indeed, in some embodiments both emissive and receptive arrays will be combined on a single chip so as to provide, for example, a chip-scale transceiver or Lidar device.

Accordingly, an embodiment of the invention is an optical beam-steering apparatus. The apparatus includes one or more optical waveguides and at least one row of metallic nanoantenna elements overlying and electromagnetically coupled to a respective waveguide. In each such row, individual nanoantenna elements are spaced apart along an optical propagation axis of the waveguide so that there is an optical propagation phase delay between successive pairs of nanoantenna elements along the row. The apparatus also includes a respective single electric heating element in thermal contact with each of the waveguides. Each heating element is arranged to heat, substantially uniformly, at least that portion of its waveguide that directly underlies the corresponding row of nanoantenna elements. The array may be conformed, e.g., as a steerable, directional, optical transmitter or receiver array. The nanoantenna elements may be dimensioned for operation in the near-infrared portion of the electromagnetic spectrum.

In embodiments, a two-dimensional metallic nanoantenna array overlies a plurality of heating elements, respective rows of nanoantenna elements as described above are subarrays of the two-dimensional nanoantenna array, and each of the rows overlies a respective heating element. In further embodiments, each of the waveguides is independently heatable by a respective, separate electrical contact.

An embodiment of the invention in another aspect is a system, comprising a two-dimensional metallic array of nanoantenna elements arranged in rows; a plurality of optical waveguides underlying the nanoantenna array such that each waveguide underlies a respective nanoantenna row; a single heating element juxtaposed between each waveguide and its respective nanoantenna row and conformed to substantially uniformly heat at least that portion of its respective waveguide that directly underlies the nanoantenna row; a source of heating current for each of the heating elements; a control unit adapted to individually control the respective heating currents in response to inputs that specify desired beam directions; and a mapping unit configured to map the specified beam directions to corresponding settings for the beam currents. The mapping unit may comprise a computer-readable memory in which is embodied a look-up table that relates beam directions to current settings.

An embodiment of the invention in yet another aspect is a method of steering an optical beam, comprising directing at least a portion of an input optical beam into a waveguide overlain by a row of metallic nanoantenna elements; heating the waveguide with a single heating element such that at least that portion of the waveguide that directly underlies the nanoantenna row acquires a substantially uniform temperature, thereby to produce a thermo-optical refractive index shift in the waveguide; and radiating at least some of the energy of the optical beam from the nanoantenna elements. In further embodiments, the input beam is split into multiple sub-beams and each of the sub-beams is directed into a respective waveguide overlain by a respective nanoantenna row; and the heating step comprises independently heating each of the waveguides, thereby to produce an independently controllable index shift in each waveguide.

An embodiment of the invention in yet another aspect is a method of directional optical reception using a two-dimensional array of metallic nanoantenna elements arranged in rows that overlie and are electromagnetically coupled to respective waveguides. The method comprises using a single heating element for each of the waveguides, independently heating each of the waveguides such that at least that portion of the waveguide that directly underlies the corresponding nanoantenna row acquires a substantially uniform temperature, thereby to produce a thermo-optical refractive index shift in the waveguide; coupling incident optical energy into the nanoantenna elements and from each row of nanoantenna elements into the underlying waveguide; and collecting and coherently combining the coupled electromagnetic energy from the waveguides.

BRIEF DESCRIPTION OF THE DRAWINGS

FIGS. 1 and 2 provide schematic views of an embodiment of the invention. FIG. 1 is a plan view and FIG. 2 is an exploded, perspective view of a detail of FIG. 1. The scales of both figures have been greatly exaggerated for ease of presentation. Features common to both figures have been designated by like reference numerals.

FIGS. 3A, 3B, and 3C provide three respective views in succession. FIGS. 4A and 4B provide two further successive views.

FIG. 9A corresponds to FIG. 8A, FIG. 9B corresponds to FIG. 8B, and FIG. 9C corresponds to FIG. 8C.

DETAILED DESCRIPTION

Figure 1:
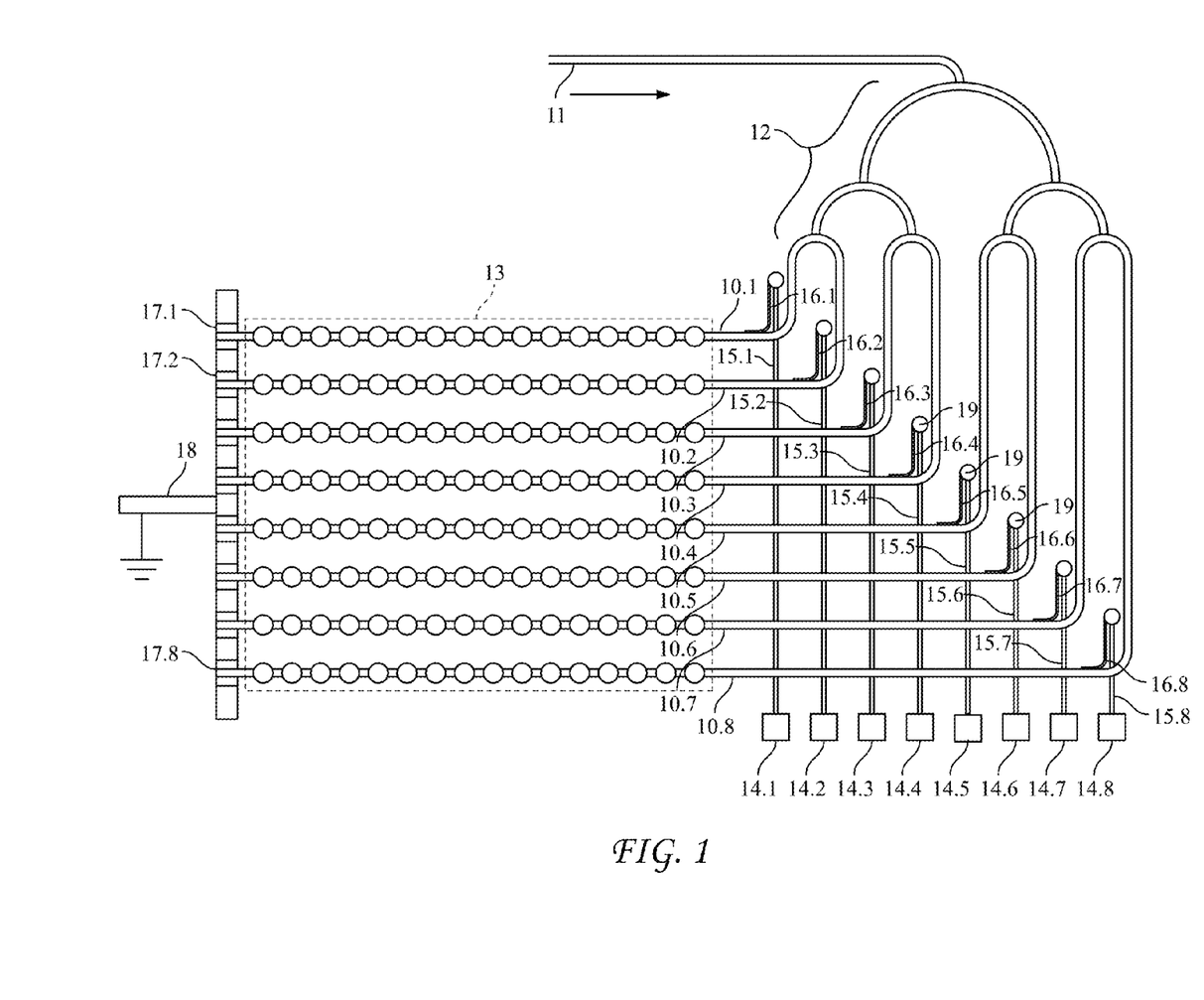
Figure 2:
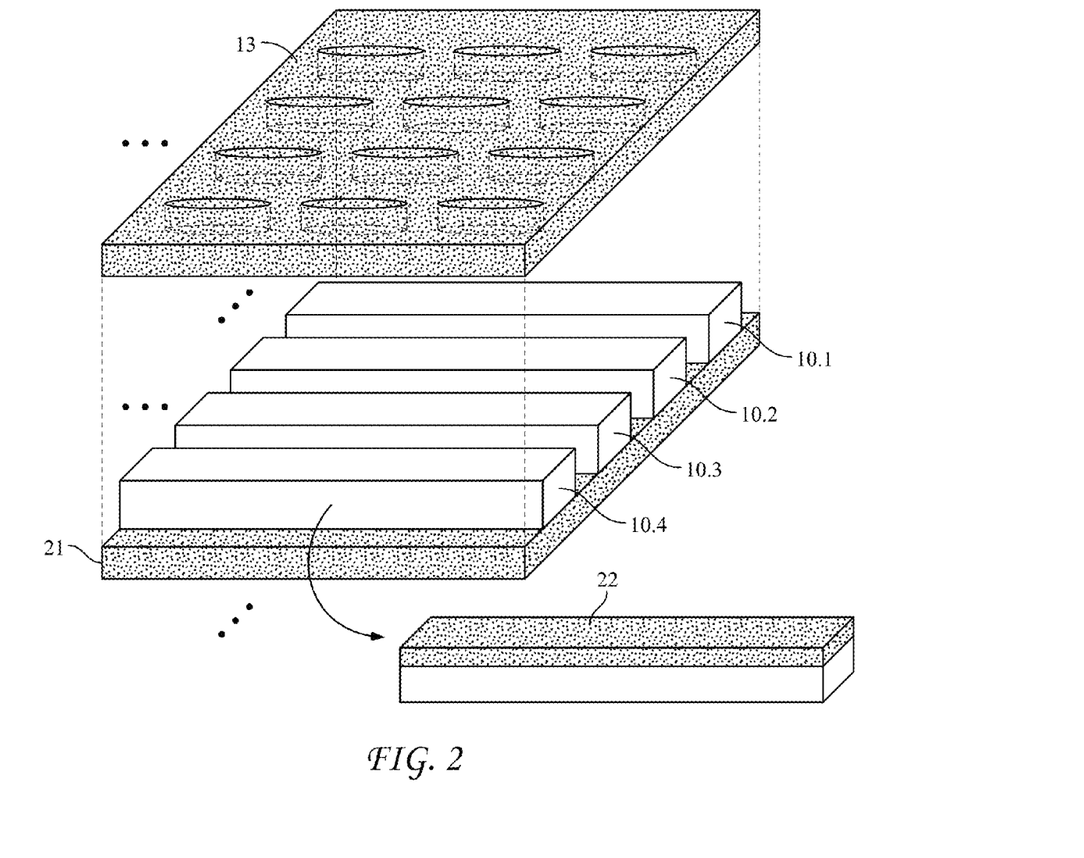

FIGS. 1 and 2 provide schematic views of an embodiment of the invention. FIG. 1 is a plan view and FIG. 2 is an exploded, perspective view of a detail of FIG. 1. The scales of both figures have been greatly exaggerated for ease of presentation. Features common to both figures have been designated by like reference numerals.

Turning now to the figures, to which joint reference is made, it will be seen that an embodiment of the invention includes a parallel array of silicon waveguides $10.1$, $10.2, \ldots, 10.N$ formed on a surface of substrate 21. The number N in the illustrative embodiment is 8, but it will be understood that the choice of eight waveguides per array is exemplary and not limiting.

The waveguides are fed an optical signal input that enters on optical fiber 11, or on an alternative type of optical waveguide. The input signal is subdivided and fed to the respective waveguides 10.1, 10.2, etc., by 1×N optical splitting arrangement 12. As will be seen, the splitting arrangement in the illustrative embodiment is a cascading sequence of 1×2 splitter stages fabricated as silicon waveguides. However, such an implementation is not limiting. Any of various alternative splitting arrangements may be used in its place without departing from the scope of the invention.

Each of the N waveguides is overlain by a linear array of emission antennas to which it is coupled by plasmonic coupling. In the illustrative embodiment, there are sixteen antennas in each linear array so that a single emissive unit provides an 8×16 array of emissive apertures. In practice, one-dimensional and two-dimensional arrays of many different sizes may be useful for various applications; hence it will be understood that the specific example of an 8×16 array is merely exemplary.

In the present example, each of the antennas is defined as a circular hole formed in a continuous metallic film 13 that overlies the waveguides. Those skilled in the art will understand that numerous variations may be substituted, including films with perforations of different shapes, as well as metallization patterns that consist of arrays of separated metal shapes instead of perforations. Although the present example uses perforations of a uniform size, it will also be understood that apodization techniques may in at least some cases be advantageously employed. In such techniques, the size or shape of the aperture, i.e. of the hole or of the discrete metal shape, is varied across the array for the purpose of shaping the emitted beam.

With further reference to FIGS. 1 and 2, it will be seen that each of waveguides 10.1-10.N is electrically connected by way of respective members 16.1-16.N that serve as optically non-perturbing electrical contacts, and by respective traces 15.1-15.N to a respective contact pad 14.1-14.N. Each of the optically non-perturbing contact members is a silicon channel that merges with a respective one of the waveguides. To minimize optical scattering, each contact member is preferably of approximately similar cross-section to its corresponding waveguide and is curved so as to merge continuously with the waveguide along a tangent.

Signal-level electrical contact is made from each of traces 15.1-15.N to its respective one of contact members 16.1-16.N by way of a respective via 19.

Each of the waveguides includes an upper portion 22 that has gained sufficient electrical conductivity, through ion implantation, for it to serve as a resistor for ohmic heating of that waveguide when suitably energized. The heating currents flow from the above-described contact pads, traces, and lead-ins, through the respective waveguides, and into ground by way of connections 17.1-17.N and ground connection 18. As illustrated, connections 17.1-17.N are connections to a common bus that is grounded through ground connection 18. In alternative arrangements, each of connections 17.1-17.N is individually grounded through, e.g., a respective ground connection similar to ground connection 18.

In operation, the heating current in each waveguide flows in a direction parallel to the optical propagation direction. The result is that each waveguide is heated to a temperature that is substantially uniform in that waveguide. The heating current in each waveguide is controllable independently of any of the other waveguides by applying independently selectable voltages to the respective contact pads 14.1-14.N. Thus, in particular, it is possible by appropriate selection of the heating currents to create any of various desired temperature gradients in the array, wherein the gradient direction is transverse to the optical propagation direction.

As is well known, silicon exhibits a relatively large thermo-optic coefficient. As a consequence, each aperture along a given waveguide can be given a respective phase, in the cyclic interval $(0, 2\pi)$ radians, that is proportional to the waveguide temperature T and to the total optical propagation distance from a reference point within the waveguide. For example, if the apertures along a given waveguide are uniformly spaced with a lattice constant $\Delta x$ and are sequentially numbered from the input end according to n=0, 1, 2, etc., then (relative to aperture 0) each phase $\phi_n$ will satisfy the relation, $\phi_n \propto n \cdot T \cdot \Delta x$.

As is well known from the theory of diffraction, the emission pattern, or beam, from a linear array of apertures typically exhibits a main central lobe and two or more subsidiary side lobes. A geometrical plane is defined by the array axis and the principle direction of optical emission from the respective apertures. We refer to rotation in that plane as "polar" rotation. By controlling the relative phases of the apertures in the linear array, it is possible to steer the beam in the polar direction. The range of beam directions that are achievable is generally limited by the angular spacing between the central lobe and the first side lobe on each side of the central lobe. This angular spacing, in turn, is dependent on the lattice constant of the array. In general, the smaller the lattice constant, the greater the angular distance between the central lobe and the side lobes.

Although the array geometry determines the phase differences between successive apertures at each given temperature, the size of those phase differences can be controlled by controlling the temperature. This provides sufficient control to steer the beam within any range between $\theta=-\pi/2$ and $\theta=\pi/2$ that is permitted by the side lobes and by practical design constraints.

A two-dimensional array of apertures can provide even more control over the beam direction. Rotations in the plane of the two-dimensional array are referred to herein as "azimuthal" rotations. As is well known to those skilled in the art, appropriate control of the respective phases of the apertures in a two-dimensional array can lead to joint steering of the beam in the polar and azimuthal directions.

Our invention can provide such phase control, which is afforded by individually controlling the (substantially uniform) temperatures of the respective waveguides. In fact, given any bearing, i.e. any combination $(\theta, \psi)$ of respective polar and azimuthal angles within the scanning range, it is possible to find at least one set of temperatures for the respective waveguides that will direct the beam in the given bearing direction. In practice, the required temperature settings can be found numerically by simulating the diffractive behavior of the array and searching over the parameter space for an effective combination of temperature settings. Various algorithms useful for such a purpose are available and need not be described here in detail.

In one simple scenario, a search is automatically performed over the parameter space, and the combinations of temperature settings that are found to be effective for each of a sufficiently exhaustive set of bearing directions are stored as, e.g., a grid in a look-up table. In operation, the look-up table is consulted to quickly provide, on demand, the temperature settings required for any given bearing direction. Interpolation may be used if a finer grid is needed. In a practical device, a controller using a special purpose or suitably programmed general purpose digital computer or processor is readily provided for such purpose.

Fabrication

FIGS. 3A-3C and 4A-4B, to which reference is jointly made, provide views of an illustrative chip-scale embodiment of a phase-steered nanoantenna array at various progressive stages in its fabrication. The cross-sectional view of the workpiece provided in the figures is not to scale and should not be regarded as a realistic depiction of the workpiece. Instead, FIGS. 3A-3C and 4A-4B are meant to be schematic and are provided only for purposes of illustrating the fabrication sequence, for ease of which various simplifications have been made.

The exemplary processing sequence illustrated here is performed using 248 nm deep ultraviolet lithography (DUV) in a silicon CMOS foundry. Alternative lithographic techniques such as e-beam lithography may be useful, particularly if there is a need to create more finely dimensioned patterns such as more complex antenna patterns.

Figure 3A:
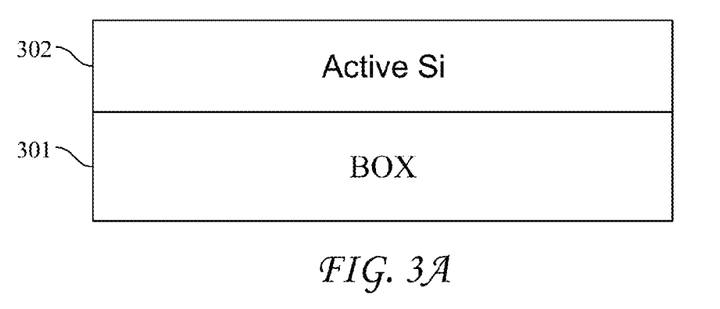
FIGS. 3A-3C and 4A-4B, to which reference is jointly made, provide views of an illustrative chip-scale embodiment of a phase-steered nanoantenna array at various progressive stages in its fabrication.

The starting substrate is a silicon on insulator (SOI) wafer with a 3-mm bottom oxide (BOX) region 301 for bottom cladding and a 13 $\Omega$-cm, 250 nm thick active silicon layer 302. (FIG. 3A.)

The silicon waveguides 303, the optically non-perturbing contact members 304, and the silicon 1×N optical splitter (not shown) are defined using standard lithography and are etched using Reactive Ion Etch (RIE). (FIG. 3B.)

Ion implantation 305 of phosphorus, followed by heating for activation and anneal, is performed to create the portions of the waveguides that will serve as resistive heaters. (FIG.

3B.) Alternative implanted ions include arsenic for n-type doping and boron for p-type doping.

Figure 3B:
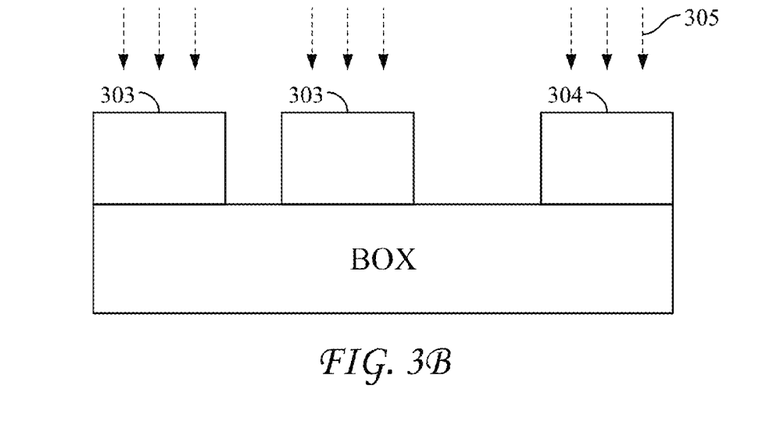

As noted above, elements 303 as seen in the schematic view of FIG. 3B represent silicon waveguides, whereas element 304 represents an optically non-perturbing contact member. The end of the member 304 distal its corresponding silicon waveguide is n+-doped to promote electrical contact; the rest of the member is n-doped, typically to a carrier density of $1\text{-}2\times10^{18}$ cm$^{-3}$.

Figure 3C:
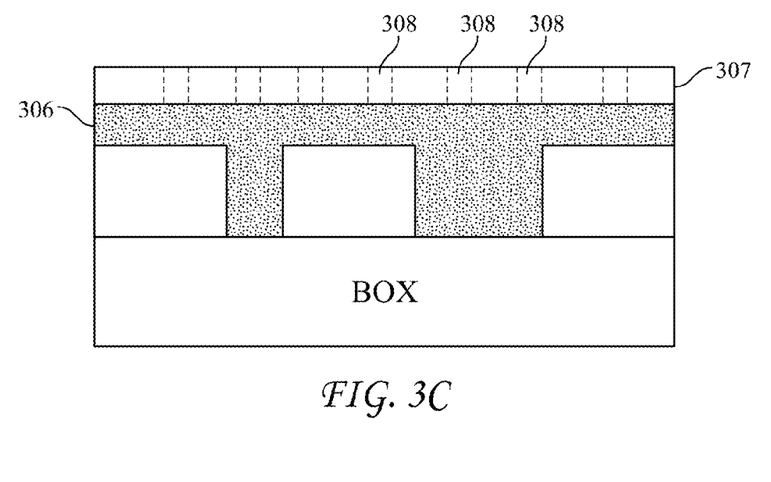

High density plasma (HDP) CVD oxide 306 is deposited and planarized with chemical mechanical polish (CMP) to a thickness of 200 nm over the silicon structures. (FIG. 3C.)

An aluminum-copper thin film 307 of 100-nm thickness, in which the nanoantenna array will be defined, is deposited by sputtering, followed with patterning by DUV lithography and RIE etching. (FIG. 3C.) One possible alternative composition for the antenna film is tantalum.

In exemplary designs, the antenna film is patterned with holes 308 that are 200-300 nm in diameter and arranged with a pitch of 750-1000 nm. If achievable with available lithography, the holes are advantageously sized with a diameter of one-half the operating wavelength, because at this size, it is theoretically possible to achieve, in a two-dimensional array a scan range of $2\pi$ steradians with no side-lobes in the steered beam.

Figure 4A:
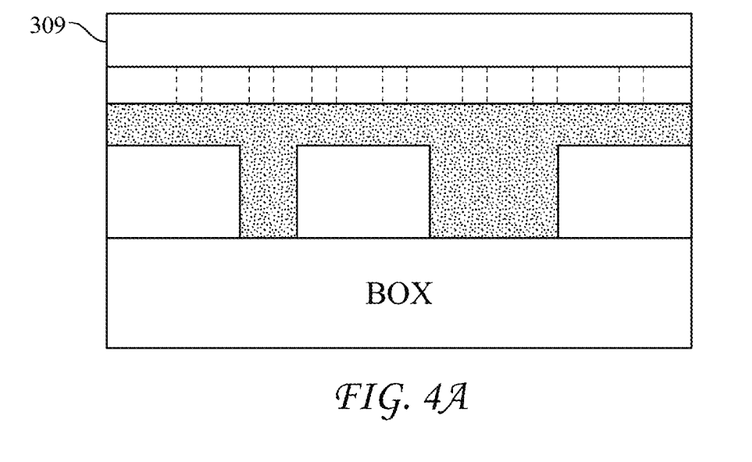

Additional HDP CVD oxide 309 is deposited and planarized with CMP to a thickness of 800 nm over the silicon waveguides. (FIG. 4A.)

Electrical contacts are defined and etched. Titanium is sputtered and heated by RTA at 750 C for contact silicide formation. For vias 310, tungsten CVD is used for contact fill, which is then planarized using CMP. (FIG. 4B.)

Metal interconnects and pads 311 are deposited using a stack of Ti/TiN/AlCu/TiN, followed by definition and etch. (FIG. 4B.)

Figure 4B:
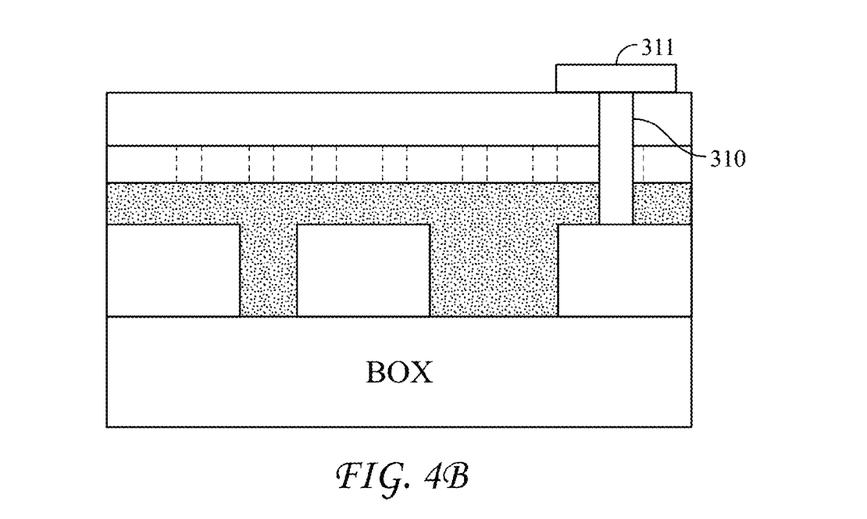

It should be noted that the via 310 shown in FIG. 4B does not make electrical contact with the antenna film 307. Instead, the via is in front of the antenna film and does not contact or pass through it. In our exemplary design, the antenna film is isolated so as to be electrically floating.

A final anneal is performed at 420 C in forming gas. (Not shown.)

To provide for coupling of an optical fiber to the input end of the 1×N splitter, the silicon substrate is subjected to a combination of reactive ion etching (RIE) and deep Bosch etch to create a facet opening at the fiber coupling point. The deep RIE Bosch etch is done to a depth of 200 μm to expose the side tapers and provide sufficient room for optical fiber alignment.

Figure 5:
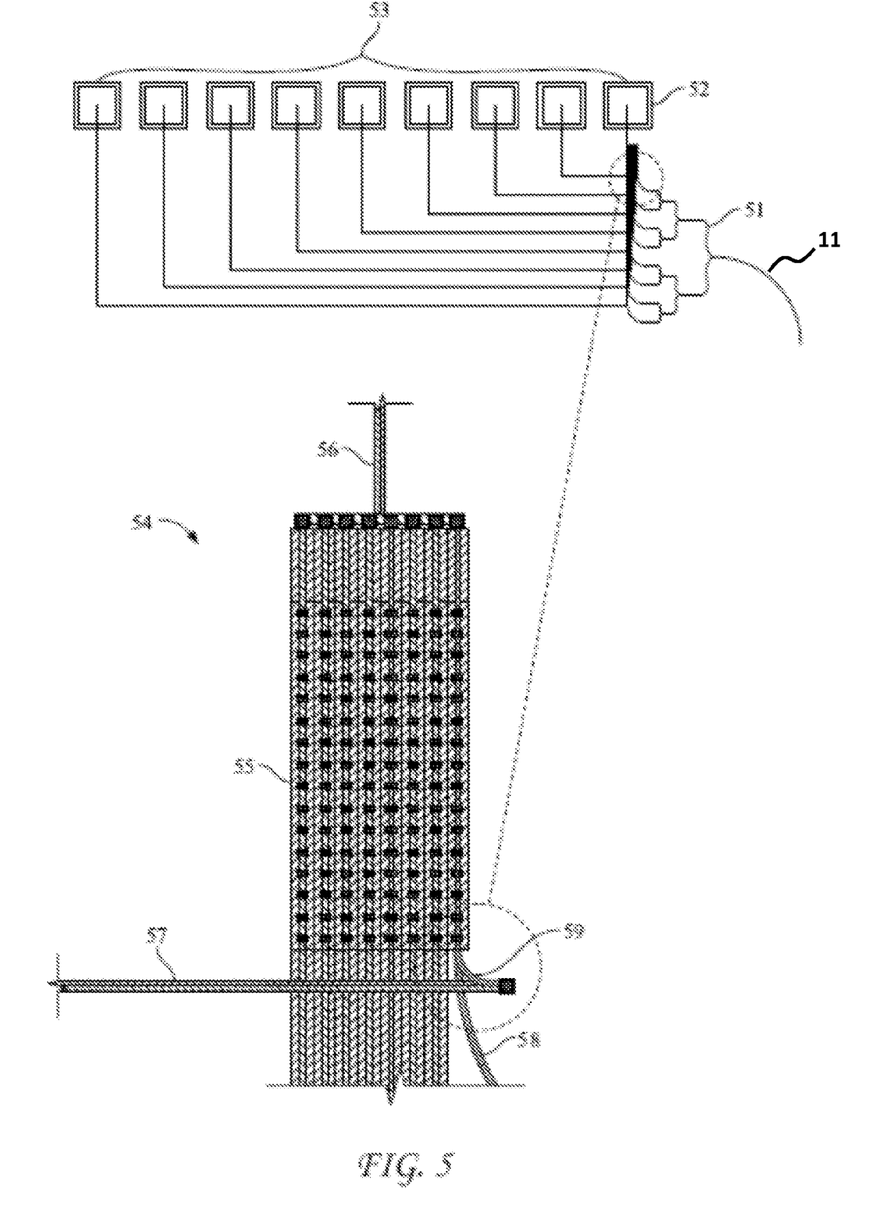
FIG. 5 provides a plan view, approximately to scale, of a portion of an exemplary layout for a device fabricated according to the procedure of FIGS. 3 and 4. A detail provides a magnified view of a portion of the illustrated layout.

FIG. 5 provides a plan view, approximately to scale, of a portion of an exemplary layout for a device fabricated according to the procedure described above. Visible in the main portion of the figure are the optical splitter 51, the ground contact pad 52 for the heater currents, and a linear array 53 of signal-level contact pads for the heater currents. More clearly visible in the detail 54 of FIG. 5 are the antenna film 55, the electrical connection 56 from the common grounding bus to the ground contact pad 52, and a representative signal-level trace 57, corresponding to silicon waveguide 58. As seen in the figure, trace 57 makes contact, through a via, to optically non-perturbing contact member 59, which in turn makes electrical contact to waveguide 58.

Example Numerical Simulation

Figure 6:
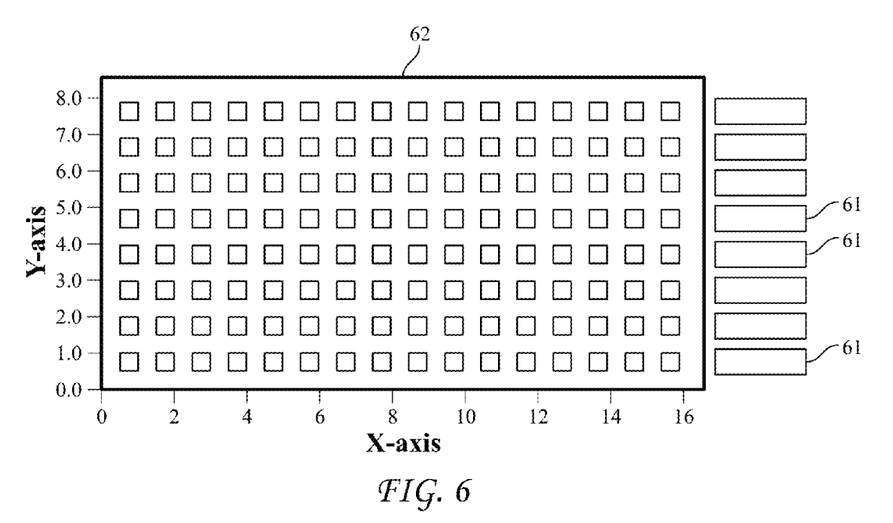
FIG. 6 provides a view of a nanoantenna array design used in a numerical simulation demonstrating principles of the present invention.

We performed a numerical simulation of the performance of a device substantially as described above. FIG. 6 provides a view of the nanoantenna array on which the simulation was based. As seen in the figure, waveguides 61 feed the optical signal into respective rows of array 61. Each of the rows extends in the direction that, for purposes of the simulation, is defined to be the direction of the x-axis. The waveguides, in the vicinity of the nanoantenna array, are likewise directed along the x-axis. The nanoantenna array is oriented in the plane formed by the x- and y-axes. Accordingly, each row is separated from its preceding row by a shift directed along the y-axis. As will further be seen in the figure, the nanoarray consists of eight rows, each containing sixteen nanoantenna elements.

The individual nanoantenna elements are dimensioned as square apertures 500 nm by 500 nm. They are spaced with a period of 1 micrometer. The optical wavelength is 3.39 micrometers. The simulation assumes a numerical aperture of 1.

Figure 7:
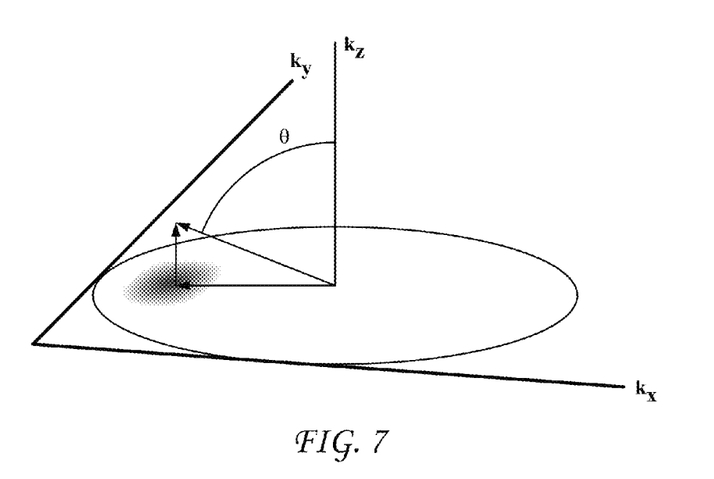
FIG. 7 provides a graphical view of a geometrical coordinate system used in the simulation of FIG. 6. The figure includes an illustration of the polar angle θ.

The coordinate system used in the simulation is further defined in FIG. 7. As seen in the figure, a spot corresponding to an emitted beam is shown projected onto the $(k_x, k_y)$ plane, in which $k_x$ is the x-component of the optical wavevector and $k_y$ is the corresponding y-component. The z-component k of the wavevector is represented by an arrow parallel to the $k_z$ axis, and the polar angle θ is shown as a rotation from the k axis to the wavevector $\vec{k}$.

Figure 8A:
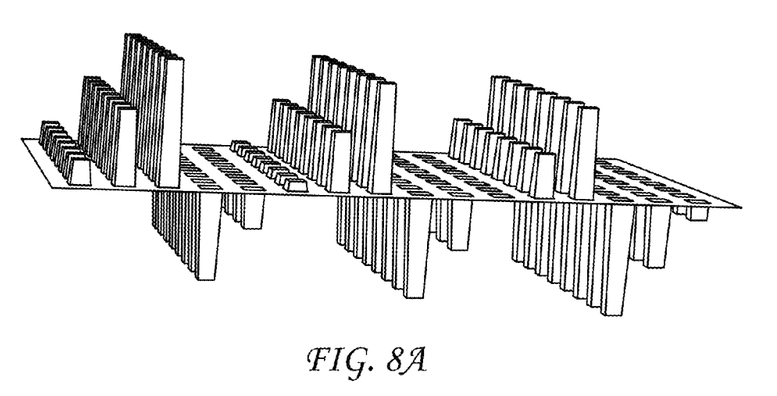
FIGS. 8A, 8B, and 8C provide a graphical illustration of the respective phases on the nanoantenna elements at three stages of the simulation of FIGS. 6 and 7. Each of FIGS. 8A, 8B, and 8C illustrates a respective phase of the simulation.
Figure 8B:
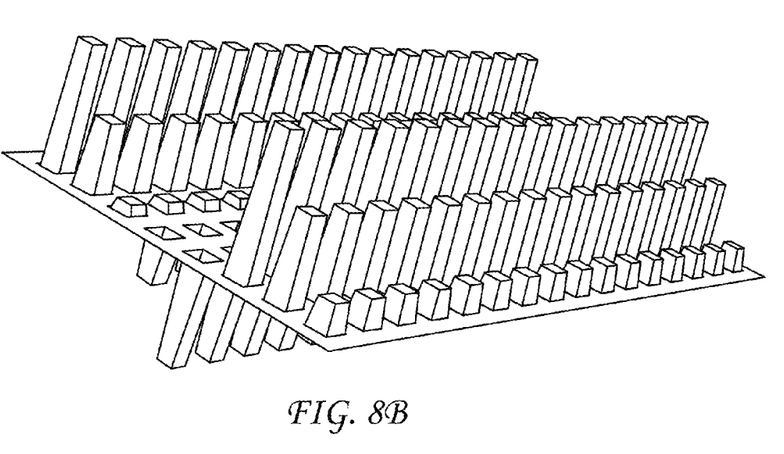
Figure 8C:
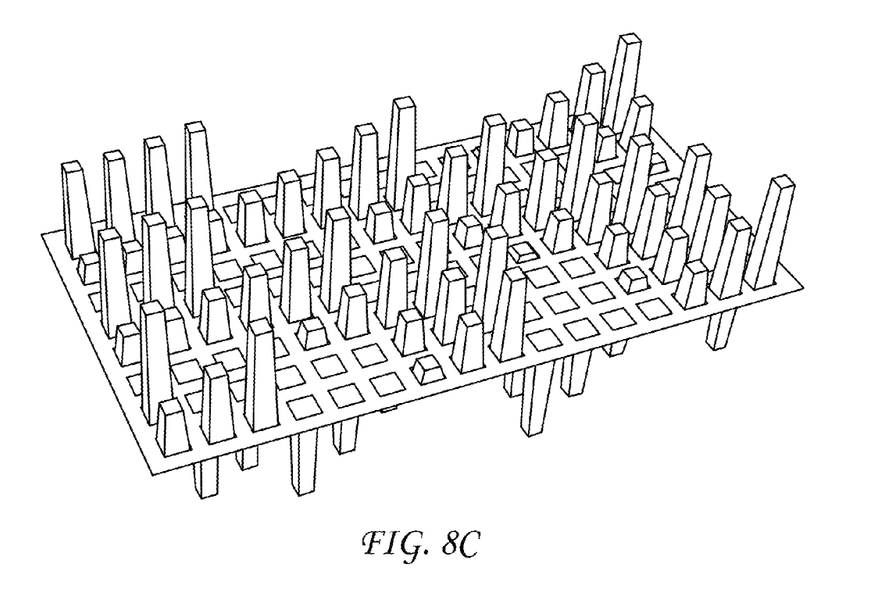
Figure 9A:
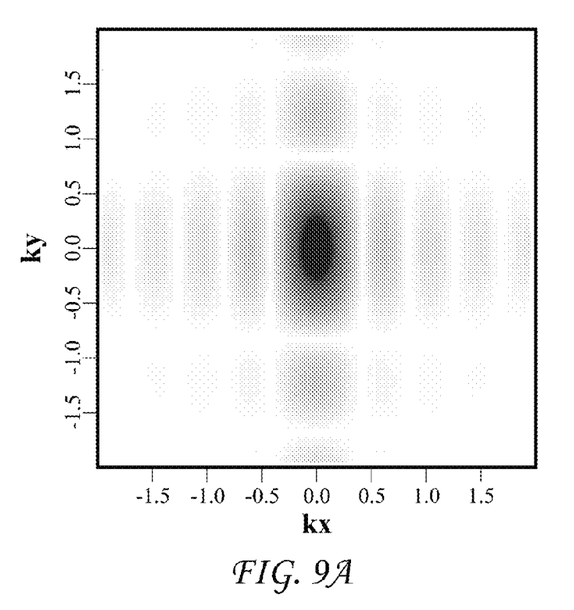
FIGS. 9A, 9B, and 9C provide graphical results of the simulation of FIGS. 6-7 and 8A-8C, illustrating the appearance of the steered beam at each of the three stages illustrated by FIGS. 8A, 8B, and 8C.
Figure 9B:
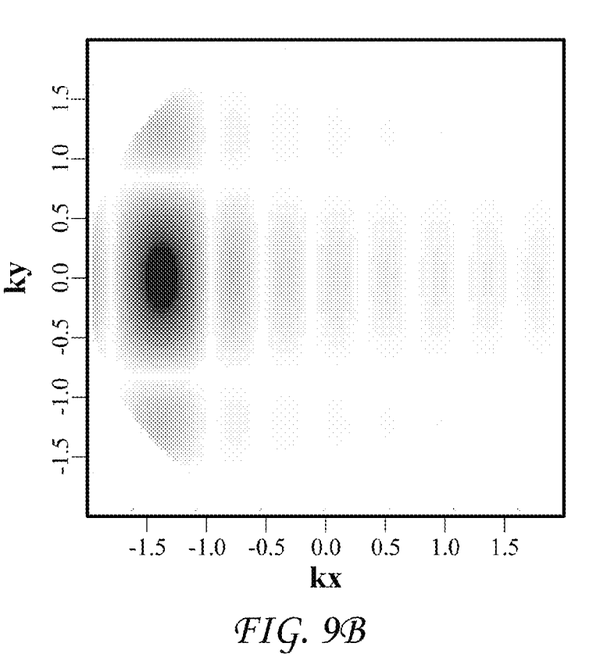
Figure 9C:
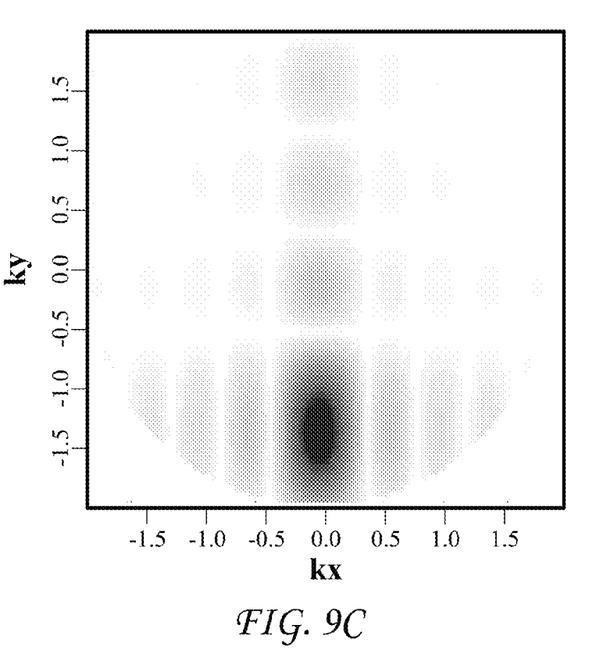

Three stages in the simulation are illustrated by FIGS. 8A-8C and 9A-9C, which for the best understanding should be viewed jointly. Each of FIGS. 8A-8C represents the phases produced in the respective nanoantenna elements by a particular choice of temperature in each of the rows in the nanoantenna array. Each of FIGS. 9A-9C represents the beam pattern, in the $(k_x, k_y)$ plane, produced by the corresponding phase distribution of FIG. 8A, 8B, or 8C. FIGS. 8A and 9A show a polar deflection θ of about 45° with azimuth in the x-direction. FIGS. 8B and 9B show a polar deflection θ of about 45° with azimuth in the y-direction. FIGS. 8C and 9C show a polar deflection θ of 37° with azimuth between the x- and y-directions.

System Implementations

Figure 10:
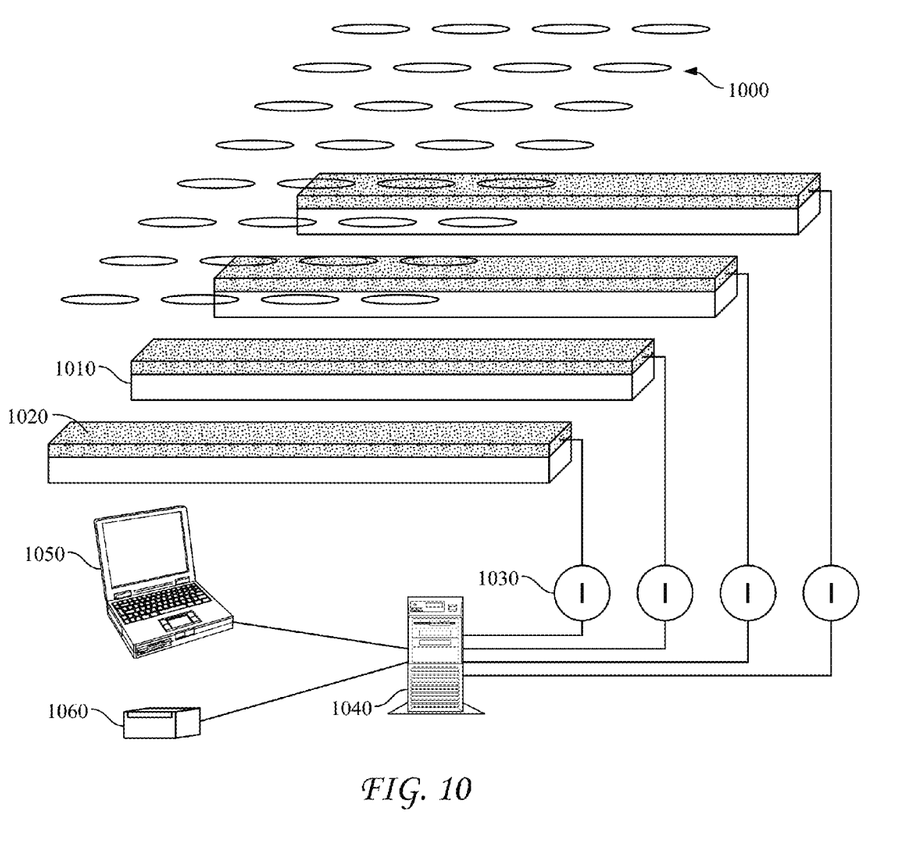
FIG. 10 provides a schematic block diagram of a system according to an embodiment of the present invention. In the system, specified beam directions are mapped to current settings, which a control unit applies to sources of heating current in order to control the beam direction.

Turning now to FIG. 10, there will be seen a schematic block diagram in which metallic nanoarray 1000 overlies waveguides 1010, each having a heating element 1020. Each heating element has a controllable source 1030 of heating current. The current sources are controlled by control unit 1040, which may by, by way of example and without limitation, any of a programmable general purpose digital computer, a special-purpose digital processor, or an application-specific integrated circuit. The control unit is responsive to inputs, exemplarily from user interface 1050, that specify desired beam directions. The control unit obtains current settings from mapping unit 1060, which maps the requested beam directions to specific current settings that produce those beam directions.

The mapping unit may, e.g., be a computer-readable memory in which is embodied a look-up table that relates beam directions to current settings. Such a table may be set in the factory, or it may be set by the end-user during an initial training procedure. Alternatively, the mapping unit may, e.g., be a computational device that computes the mappings from a stored algorithm. These examples are illustrative, and are not meant to be limiting as to the various types of mapping unit that are feasible.

What is claimed:

1. Optical beam-steering apparatus comprising:
one or more optical waveguides;
at least one row of at least sixteen metallic nanoantenna elements overlying and electromagnetically coupled to a respective waveguide, in which individual nanoantenna elements are spaced apart along an optical propagation axis of the respective waveguide so that there is an optical propagation phase delay between successive pairs of nanoantenna elements along the row, and wherein the individual nanoantenna elements are spaced apart with a period that is less than an operating wavelength of the optical beam-steering apparatus;
one or more heating elements arranged such that to each of the respective waveguides there corresponds a respective single electric heating element in thermal contact with its corresponding respective waveguide and arranged to heat, substantially uniformly, at least that portion of its corresponding respective waveguide that directly underlies the corresponding row of nanoantenna elements.

2. The apparatus of claim 1, comprising a plurality of said rows, each of which overlies a respective waveguide in thermal contact with a respective heating element, and wherein the rows are sub-arrays of a two-dimensional metallic nanoantenna array.

3. The apparatus of claim 2, further comprising a separate electrical contact for each of the heating elements whereby each of the waveguides can be independently heated.

4. The apparatus of claim 1, conformed as a steerable, directional, optical transmitter array.

5. The apparatus of claim 1, conformed as a steerable, directional, optical receiver array.

6. The apparatus of claim 1, wherein the nanoantenna row or rows and the nanoantenna elements are dimensioned for operation at near-infrared wavelengths.

7. The apparatus of claim 1, wherein the waveguides are defined in a silicon layer disposed on a silicon or SOI wafer.

8. The apparatus of claim 7, wherein each heating element is a doped silicon layer adjacent to a respective silicon waveguide.

9. The apparatus of claim 8, wherein each heating element is interposed between a respective silicon waveguide and the corresponding row of metallic nanoantenna elements.

10. A system, comprising:
a two-dimensional metallic array of nanoantenna elements arranged in rows wherein each row includes at least sixteen nanoantenna elements spaced apart with a period that is less than an operating wavelength of the system;
a plurality of optical waveguides underlying the nanoantenna array such that each waveguide underlies a respective nanoantenna row;
a single heating element juxtaposed between each waveguide and its respective nanoantenna row and conformed to substantially uniformly heat at least that portion of its respective waveguide that directly underlies the nanoantenna row;
a source of heating current for each of the heating elements;
a control unit adapted to individually control the respective heating currents in response to inputs that specify desired beam directions; and
a mapping unit configured to map the specified beam directions to corresponding settings for the heating currents.

11. The system of claim 10, wherein the mapping unit comprises a computer-readable memory in which is embodied a look-up table that relates beam directions to current settings.

12. The system of claim 10, wherein the waveguides are defined in a silicon layer disposed on a silicon or SOI wafer, and wherein the heating elements comprise doped silicon layers adjacent to their respective waveguides.

13. The system of claim 12, further comprising an optical splitter defined in the silicon layer on the silicon or SOI wafer and conformed to distribute a respective portion of an input optical beam into each of the waveguides.

14. The system of claim 10, wherein the nanoantenna array is dimensioned for near-IR operation.

15. A method of steering an optical beam, comprising:
directing at least a portion of an input optical beam into a waveguide overlain by a row of at least sixteen metallic nanoantenna elements spaced apart with a period that is less than a wavelength of the optical beam;
heating the waveguide with a single heating element such that at least that portion of the waveguide that directly underlies the nanoantenna row acquires a substantially uniform temperature, thereby to produce a thermo-optical refractive index shift in the waveguide; and
radiating at least some of the energy of the input optical beam from the nanoantenna elements.

16. The method of claim 15, further comprising splitting the input beam into multiple sub-beams, wherein:
each of the sub-beams is directed into a respective waveguide overlain by a respective nanoantenna row; and
the heating step comprises independently heating each of the waveguides, thereby to produce an independently controllable index shift in each waveguide.

17. The method of claim 16, wherein each waveguide is heated by directing a heating current through a respective heating element, and wherein the method further comprises obtaining a heating current setting for each waveguide in response to an input indicating a desired beam direction.

18. The method of claim 17, wherein the desired beam direction is determined by two orthogonal coordinates, one said coordinate is substantially controlled by phase shifts between successive nanoantenna elements along each row, and the other said coordinate is substantially controlled by phase shifts between successive rows.

19. A method of directional optical reception using a two-dimensional array of metallic nanoantenna elements arranged in rows that overlie and are electromagnetically coupled to respective waveguides, comprising:
using a respective single heating element for each of the waveguides, independently heating each of the waveguides such that for each said waveguide, at least that portion of the waveguide that directly underlies the corresponding nanoantenna row acquires a substantially uniform temperature, thereby to produce a thermo-optical refractive index shift in said waveguide;
coupling incident optical energy into at least sixteen nanoantenna elements that are spaced apart by less than a wavelength of the incident optical energy in each said row, and coupling the incident optical energy from each row of nanoantenna elements into the underlying waveguide; and
collecting and coherently combining the coupled electromagnetic energy from the waveguides.

20. The method of claim 19, wherein:
each of the heating elements is activated by a respective heating current;
the method further comprises obtaining a heating current setting for each waveguide in response to an input indicating a desired beam direction; and the beam direction is determined by two orthogonal coordinates, one of which is substantially controlled by phase shifts between successive nanoantenna elements along each row, and the other of which is substantially controlled by phase shifts between successive rows.

* * * * *